US011208561B2

(12) United States Patent
Li et al.

(10) Patent No.: US 11,208,561 B2
(45) Date of Patent: Dec. 28, 2021

(54) COLORANT AND PREPARATION METHOD THEREOF

(71) Applicant: Baotou Rare Earth Research and Development Center, Chinese Academy of Sciences, Batou (CN)

(72) Inventors: Chengyu Li, Batou (CN); Hongjie Zhang, Batou (CN); Lei Tian, Batou (CN); Jianyi Chi, Batou (CN); Ran Pang, Batou (CN); Wei Jiang, Batou (CN); Ming Wang, Batou (CN); Bin Wang, Batou (CN); Kaiqiang Dong, Batou (CN)

(73) Assignee: Baotou Rare Earth Research and Development Center, Chinese Academy of Sciences, Baotou (CN)

( * ) Notice: Subject to any disclaimer, the term of this patent is extended or adjusted under 35 U.S.C. 154(b) by 719 days.

(21) Appl. No.: 16/084,379

(22) PCT Filed: Aug. 9, 2017

(86) PCT No.: PCT/CN2017/096520
§ 371 (c)(1),
(2) Date: Sep. 12, 2018

(87) PCT Pub. No.: WO2019/000581
PCT Pub. Date: Jan. 3, 2019

(65) Prior Publication Data
US 2021/0102073 A1   Apr. 8, 2021

(30) Foreign Application Priority Data

Jun. 29, 2017   (CN) .......................... 201710513423.7

(51) Int. Cl.
*C09C 3/06* (2006.01)
*C09C 1/00* (2006.01)
*C01F 17/288* (2020.01)

(52) U.S. Cl.
CPC .............. *C09C 3/06* (2013.01); *C01F 17/288* (2020.01); *C09C 1/00* (2013.01); *C01P 2006/62* (2013.01);
(Continued)

(58) Field of Classification Search
CPC .......................... C01F 17/288; C01P 2002/72; C01P 2006/62; C01P 2006/63; C01P 2006/64; C09C 1/00; C09C 3/06
See application file for complete search history.

(56) References Cited

FOREIGN PATENT DOCUMENTS

| CN | 1426376 A | 6/2003 |
|---|---|---|
| CN | 101024770 A | 8/2008 |
| WO | 2009083867 A1 | 7/2009 |

OTHER PUBLICATIONS

"Effect of some dopant elements on the low temperature formation of Y-Ce2S3" to Romero et al. Journal of Alloys and Compounds 302 (2000) 118-127 2000.*

(Continued)

*Primary Examiner* — Shuangyi Abu Ali
(74) *Attorney, Agent, or Firm* — Bay State IP, LLC

(57) ABSTRACT

The present invention discloses a rare-earth sulfide colorant and a preparation method thereof. The chemical formula of the rare-earth sulfide colorant of the present invention is $RE_{2-2x}S_{3-3x} \cdot 2y[REPO_4]$, wherein RE is selected from one or more of La, Ce, Pr, Nd and Sm, and the ratio of y to x is 0.001 to 0.65. The present invention also discloses use of a phosphorus-containing compound for increasing the vividness of a rare-earth sulfide colorant.

7 Claims, 2 Drawing Sheets

(52) U.S. Cl.
CPC ...... *C01P 2006/63* (2013.01); *C01P 2006/64* (2013.01)

(56) References Cited

OTHER PUBLICATIONS

S. Romero et al., Effect of some dopant elements on the low temperature formation of γ-Ce2S3, Journal of Alloys and Compounds 302 (2000), pp. 118-127.

* cited by examiner

COLORANT AND PREPARATION METHOD THEREOF

CROSS REFERENCE TO RELATED APPLICATION

This application is for entry into the U.S. National Phase under § 371 for International Application No. PCT/CN2017/096520 having an international filing date of Aug. 9, 2017, and from which priority is claimed under all applicable sections of Title 35 of the United States Code including, but not limited to, Sections 120, 363, and 365(c) and which in turn claims priority under 35 USC 119 to Chinese Patent Application No. 201710513423.7 filed on Jun. 29, 2017.

TECHNICAL FIELD

The present invention relates to a colorant and a preparation method thereof, and in particular to a phosphorus-containing rare-earth sulfide colorant and a preparation method thereof. The present invention also relates to use of a phosphorus-containing compound.

BACKGROUND

With the enhancement of environmental awareness among people, many countries have issued relevant laws for prohibiting the use of toxic pigments containing heavy metals such as lead, cadmium and mercury. In 2016, the Ministry of Industry and Information Technology of the People's Republic of China, the Ministry of Science and Technology of the People's Republic of China, and the Ministry of Ecology and Environment of the People's Republic of China jointly issued "Catalogue of Substitutes for Toxic and Harmful Raw Materials (Products) as Encouraged by the State", in which rare-earth sulfides (such as cerium sulphide) were used as substitutes.

Rare-earth sulfides are bright in color, non-toxic, strong in covering power, and strongly absorb ultraviolet rays, and thus can replace the current widely-used organic red pigments and heavy metal pigments containing lead and cadmium, to be widely used in many fields fields of plastics, plastic paints, printing ink, leather, and the like.

The General Research Institute for Nonferrous Metals has developed a new two-stage process for preparing a red pigment of cerium sulphide by using cerium oxide, sulphur, sodium carbonate, hydrogen, and the like as raw materials. This process does not use toxic gases such as hydrogen sulfide or carbon sulfide, and thus is easy to implement industrially. The Inner Mongolia University of Science&Technology prepares a rare-earth sulfide precursor by reacting a rare-earth salt solution with a vulcanizing reagent, and then passes through a dry vulcanizing gas to vulcanize the precursor at a temperature lower than 1000° C., so as to obtain a rare-earth sulfide pigment. Additionally, a rare-earth sulfide pigment also can be prepared by reacting at a high temperature, using a cerium compound as a raw material, using an alkali metal compound as an additive, using sulfur as a vulcanizing agent, and using activated carbon as an adjuvant. Some methods for preparing a rare-earth sulfide are also disclosed in CN1201441A, CN1271332A, CN1426376A, and CN1087273C.

On one hand, the rare-earth sulfide obtained by the aforementioned method can be directly used as a pigment after being grinded, but the vividness of the pigment is poor, and thus it is necessary to undergo a fluorine washing treatment process to improve the color properties of the pigment. The fluorine washing treatment process is relatively complicated and produces a large amount of industrial waste liquid; and meanwhile it leads to an increase in production cost and a decrease in production efficiency. Therefore, currently there is still a need for a rare-earth sulfide colorant which can achieve a relatively high degree of vividness without undergoing the fluorine washing treatment process; and there is also a need for a method for preparing a colorant, which does not require the fluorine washing treatment process, thereby saving production costs and increasing production efficiency.

On the other hand, Chinese Patent Application No. 200710036985.3 discloses a method for synthesizing a rare-earth oxysulfide luminescent material by using a mixture of one or more of an alkali metal sulfide, an alkali metal carbonate, an alkali metal metal phosphate and an alkali metal hydrophosphate as a fluxing agent, where the fluxing agent first reacts with an elemental sulfur, the alkali metal sulfide or a mixture of them at a high temperature to generate an alkali metal polysulfide, and the generated alkali metal polysulfide reacts with a rare-earth compound to synthesize the corresponding rare-earth oxysulfide luminescent material. That is, in the aforementioned method the alkali metal phosphate and the alkali alkali metal hydrophosphate are used as fluxing agents to reduce the reaction temperature of the high-temperature solid phase reaction, but it does not involve using the alkali metal phosphate or the like to enhance the vividness of the rare-earth sulfide colorant. Furthermore, the rare-earth oxysulfide luminescent material and the rare-earth sulfide colorant belong to different technical fields. The rare-earth oxysulfide luminescent material and the rare-earth sulfide have different chemical structures and have completely different properties, and belong to different technical fields. Therefore, the manufacturing technology of the luminescent material is generally not applied to manufacture the colorant. Also, the dosages of the alkali metal phosphate and the alkali metal hydrophosphate which are used as the fluxing agents are very small with respect to the rare-earth element, and are negligible in the product.

In view of the above, currently there is no report of a phosphorus-containing rare-earth sulfide colorant which can achieve a relatively high vividness without undergoing the fluorine washing treatment process; and there is also no report for the use of the phosphorus-containing compound for improving the vividness of the rare-earth sulfide colorant.

SUMMARY

An object of the present invention is to provide use of a phosphorus-containing compound for enhancing the vividness of a rare-earth sulfide colorant.

Another object of the present invention is to provide a rare-earth sulfide colorant, the vividness of which is improved without a fluorine washing treatment process.

Still another object of the present invention is to provide a method for producing the aforementioned colorant, which is simple in process and eliminates the fluorine washing treatment process.

The present invention provides use of a phosphorus-containing compound for improving the vividness of a rare-earth sulfide colorant, where the phosphorus-containing compound is selected from one or more of an alkali metal phosphate, an alkali metal hydrophosphate, an alkali metal dihydric phosphate, an alkaline-earth metal phosphate, a rare-earth metal phosphate, a transition metal phosphate, an ammonium phosphate salt, an ammonium hydrogen phosphate salt, an ammonium dihydrogen phosphate salt, an aluminum phosphate salt, a boron phosphate salt, and phosphorus pentoxide.

According to the use of the present invention, preferably the rare-earth sulfide colorant has the following chemical formula:

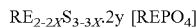

wherein RE is selected from one or more of La, Ce, Pr, Nd, and Sm, and the ratio of y to x is 0.001 to 0.65.

The present invention also provides a rare-earth sulfide colorant of the chemical formula below:

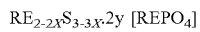

wherein RE is selected from one or more of La, Ce, Pr, Nd, and Sm, and the ratio of y to x is 0.001 to 0.65.

According to the colorant of the present invention, preferably RE is La, Ce, Pr, or Nd, and the ratio of y to x is 0.01 to 0.55.

According to the colorant of the present invention, preferably the chromaticity coordinates of the colorant are:
(1) L=55±5, a=58±5, and b=40±5;
(2) L=80±5, a=−20±5, and b=40±5; or
(3) L=85±5, a=5±2, and b=85±5.

The present invention also provides a method for preparing the aforementioned colorant, including the following steps: mixing a rare-earth compound, a sulfur source, a phosphorus-containing compound and an alkali metal compound to obtain a mixture, and reacting the mixture at 700-1500° C. to obtain the colorant; wherein the phosphorus-containing compound is selected from one or more of an alkali metal phosphate, an alkali metal hydrophosphate, an alkali metal dihydric phosphate, an alkaline-earth metal phosphate, a rare-earth metal phosphate, a transition metal phosphate, an ammonium phosphate salt, an ammonium hydrogen phosphate salt, an ammonium dihydrogen phosphate salt, an aluminum phosphate salt, a boron phosphate salt, and phosphorus pentoxide; and the preparation method does not include a fluorine-washing treatment process.

According to the preparation method of the present invention, preferably the rare-earth compound is selected from one or more of a rare-earth metal carbonate, a rare-earth metal oxide, a rare-earth metal oxalate, rare-earth metal sulfate, and a rare-earth metal nitrate; the sulfur source is selected from one or more of sulfur, sulfide or sulfate; and the alkali metal compound is selected from one or more of a carbonate, an oxide and a hydroxide of an alkali metal element.

According to the preparation method of the present invention, preferably a molar ratio of the alkali metal element in the alkali metal compound to the rare-earth element in the rare-earth compound is 0.06-0.30:1; a molar ratio of the alkali metal element in the alkali metal compound to the sulfur element in the sulfur source is 0.02-0.1:1; and a molar ratio of the alkali metal element in the alkali metal compound to the phosphorus element in the phosphorus-containing compound is 0.1-0.4:1.

According to the preparation method of the present invention, preferably a molar ratio of the rare-earth element in the rare-earth compound to the sulfur element in the sulfur source is 1:1.5-4, and a molar ratio of the sulfur element in the sulfur source to the phosphorus element in the phosphorus-containing compound is 0.9-16:1.

According to the preparation method of the present invention, preferably the mixture is reacted in the following atmosphere to obtain the colorant: hydrogen, hydrogen sulfide, carbon disulfide, carbon monoxide, nitrogen, or air.

In the present invention, the phosphorus-containing compound is added to the preparation process of the rare-earth sulfide colorant, thereby enhancing the vividness of the colorant, and thus a coloring agent having a relatively high vividness can be obtained without the fluorine washing treatment process. Furthermore, the preparation method of the present invention can reduce the production cost, eliminate the sewage treatment section, and improve the production efficiency.

DESCRIPTION OF THE EMBODIMENTS

Figure 1:
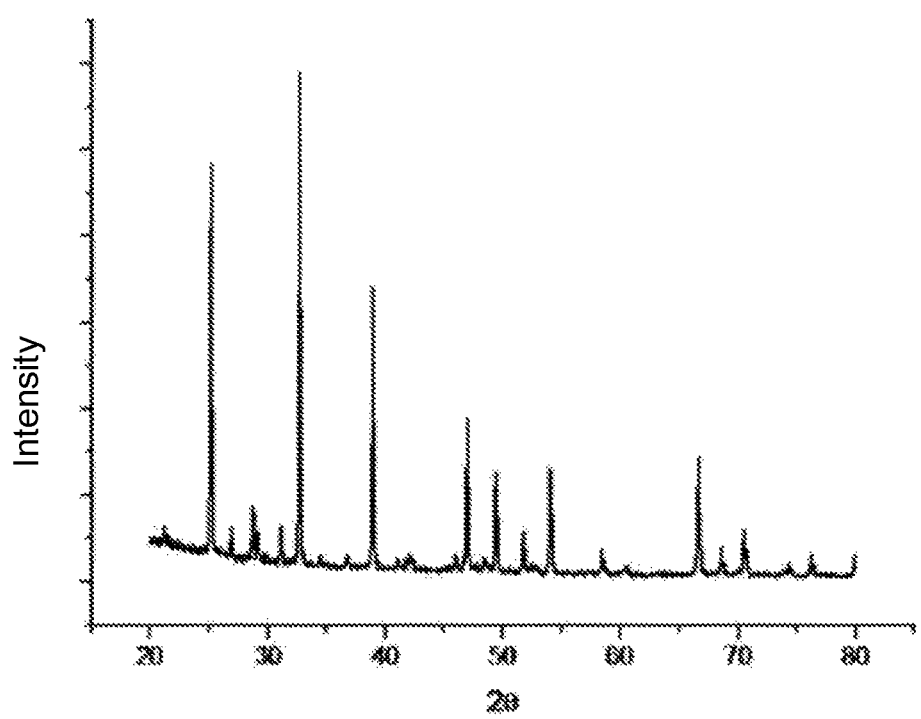
FIG. 1 is an XRD diffraction pattern of Example 5.
Figure 2:
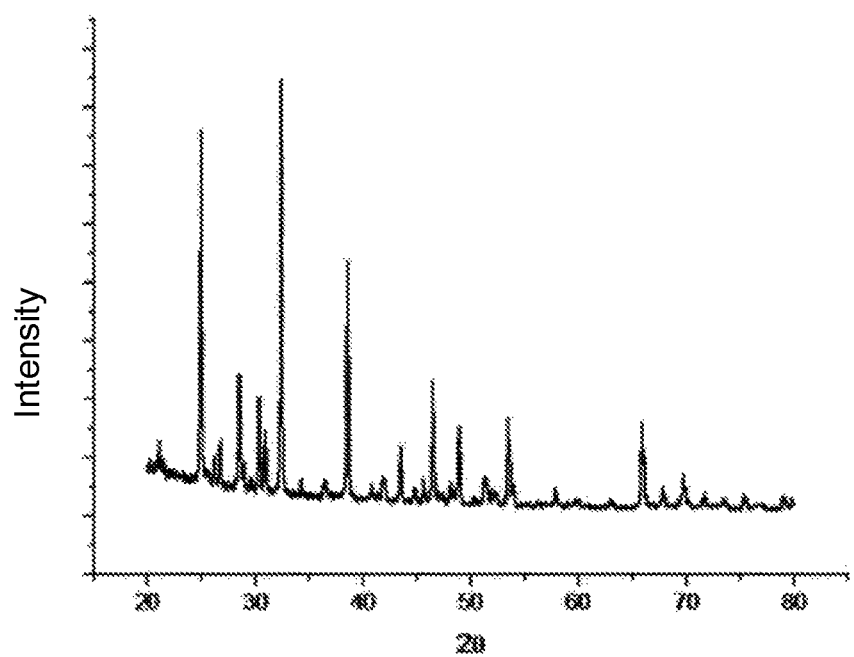
FIG. 2 is an XRD diffraction pattern of Example 12.

The present invention will be further described below in connection with specific embodiments, but the claimed scope of the present invention is not limited thereto. The Lab color space is designed to approximate human vision. The color space of the present invention is also referred to as colour space and chromaticity coordinates. In the Lab color space, L represents the brightness, and a and b represent the dimensions of color opponency. When the value of L is 0, the color is black, and when the value of L is close to 100, the color is white; the value of a represents the position of the color between red and green; and the value of b represents the position of the color between blue and yellow.

Use

The present invention provides use of a phosphorus-containing compound for enhancing the vividness of a rare-earth sulfide colorant. In the present invention, the phosphorus-containing compound is selected from one or more of an alkali metal phosphate, an alkali metal hydrophosphate, an alkali metal dihydric phosphate, an alkaline-earth metal phosphate, a rare-earth metal phosphate, a transition metal phosphate, an ammonium phosphate, an ammonium hydrogen phosphate salt, an ammonium dihydrogen phosphate salt, an aluminum phosphate salt, a boron phosphate salt, and phosphorus pentoxide. Preferably, the phosphorus-containing compound is selected from the alkali metal phosphate, the alkali metal hydrophosphate, the alkali metal dihydric phosphate, the ammonium phosphate salt, the ammonium hydrogen phosphate salt, the ammonium dihydrogen phosphate salt, or the aluminum phosphate salt. More preferably, the phosphorus-containing compound is selected from the alkali metal phosphate, the alkali metal hydrophosphate, the alkali metal dihydric phosphate, the ammonium phosphate salt, the ammonium hydrogen phosphate salt, and the ammonium dihydrogen phosphate salt. Most preferably, the phosphorus-containing compound is selected from the alkali metal phosphate or the ammonium phosphate salt. Examples of the phosphorus-containing compound of the present invention include, but are not limited to, ammonium phosphate, ammonium hydrogen phosphate, ammonium dihydrogen phosphate, sodium phosphate, sodium hydrogen phosphate, sodium dihydrogen phosphate, potassium phosphate, potassium hydrogen phosphate, potassium dihydrogen phosphate, aluminum phosphate, zinc phosphate, etc. Preferably, the phosphorus-containing compound of the present invention is ammonium phosphate, ammonium hydrogen phosphate, ammonium dihydrogen phosphate, aluminum phosphate, or zinc phosphate.

In the present invention, the rare-earth sulfide colorant has the following chemical formula:

$$RE_{2-2x}S_{3-3x} \cdot 2y\ [REPO_4]$$

wherein RE is selected from one or more of La, Ce, Pr, Nd, and Sm, and the ratio of y to x is 0.001 to 0.65.

In the present invention, RE is preferably La, Ce, Pr or Nd, and more preferably Ce. In the present invention, preferably the ratio of y to x is 0.01 to 0.55. Examples of the rare-earth sulfide colorant include, but are not limited to $Ce_{2-2x}S_{3-3x} \cdot 2y\ [CePO_4]$, $La_{2-2x}S_{3-3x} \cdot 2y\ [LaPO_4]$, $Pr_{2-2x}S_{3-3x} \cdot 2y\ [PrPO_4]$, $Nd_{2-2x}S_{3-3x} \cdot 2y\ [NdPO_4]$, and $Sm_{2-2x}S_{3-3x} \cdot 2y\ [SmPO_4]$, wherein the ratio of y to x is 0.001 to 0.65; and preferably 0.01 to 0.55.

Colorant

The colorant of the present invention is a rare-earth sulfide of the chemical formula below:

$$RE_{2-2x}S_{3-3x} \cdot 2y\ [REPO_4]$$

wherein RE is selected from one or more of La, Ce, Pr, Nd, and Sm, and the ratio of y to x is 0.001 to 0.65.

In the present invention, RE is preferably La, Ce, Pr, Nd or Sm, and more preferably Ce. In the present invention, preferably the ratio of y to x is 0.01 to 0.55.

In the present invention, the rare-earth sulfide colorant may include $Ce_{2-2x}S_{3-3x} \cdot 2y\ [CePO_4]$, $La_{2-2x}S_{3-3x} \cdot 2y\ [LaPO_4]$, $Pr_{2-2x}S_{3-3x} \cdot 2y\ [PrPO_4]$, $Nd_{2-2x}S_{3-3x} \cdot 2y\ [NdPO_4]$, or $Sm_{2-2x}S_{3-3x} \cdot 2y\ [SmPO_4]$, wherein the ratio of y to x is 0.001 to 0.65; and preferably 0.01 to 0.55.

The colorant of the present invention may be of different colors, such as red, green or yellow, depending on the rare-earth element RE. For example, $Ce_{2-2x}S_{3-3x} \cdot 2y\ [CePO_4]$ is shown in red. In order to obtain better vividness, the chromaticity coordinates of the colorant of the present invention may be:
(1) L=55±5, a=58±5, and b=40±5;
(2) L=80±5, a=−20±5, and b=40±5; or
(3) L=85±5, a=5±2, and b=85±5.

Preferably, the chromaticity coordinates of the colorant of the present invention are:
(1) L=55±3, a=58±3, and b=40±3;
(2) L=80±3, a=−20±3, and b=40±3; or
(3) L=85±3, a=5±1, and b=85±3.

More preferably, the chromaticity coordinates of the colorant of the present invention are:
(1) l=55±1, a=58±1, and b=40±1;
(2) L=80±1, a=−20±1, and b=40±1; or
(3) L=85±1, a=5±0.5, and b=85±1.

Method for Preparing Colorant

The method for preparing the colorant of the present invention includes the following steps: mixing a rare-earth compound, a sulfur source, a phosphorus-containing compound and an alkali metal compound to obtain a mixture, and reacting the mixture at 700-1500° C. to obtain the colorant. The aforementioned preparation method does not include a fluorine washing treatment process, thereby being capable of saving production costs, reducing industrial waste liquid, and shortening the process flow. There is no specific limitation on the mixing order. For example, the rare-earth compound, the sulfur source, and the phosphorus-containing compound are uniformly mixed, and then the alkali metal compound is added as a fluxing agent, and uniformly mixed to obtain a mixture. Also, for example, the rare-earth compound, the sulfur source, the phosphorus-containing compound, and the alkali metal compound are together uniformly mixed to obtain a mixture.

In the preparation method of the present invention, the phosphorus-containing compound is selected from one or more of an alkali metal phosphate, an alkali metal hydrophosphate, an alkali metal dihydric phosphate, an alkaline-earth metal phosphate, a rare-earth metal phosphate, a transition metal phosphate, an ammonium phosphate, an ammonium hydrogen phosphate salt, an ammonium dihydrogen phosphate salt, an aluminum phosphate salt, a boron phosphate salt, and phosphorus pentoxide. Preferably, the phosphorus-containing compound is selected from the alkali metal phosphate, the alkali metal hydrophosphate, the alkali metal dihydric phosphate, the ammonium phosphate salt, the ammonium hydrogen phosphate salt, or the aluminum phosphate salt. More preferably, the phosphorus-containing compound is selected from the alkali metal phosphate, the alkali metal hydrophosphate, the alkali metal dihydric phosphate, the ammonium phosphate salt, the ammonium hydrogen phosphate salt, and the ammonium dihydrogen phosphate salt. Most preferably, the phosphorus-containing compound is selected from the alkali metal phosphate or the ammonium phosphate salt. Examples of the phosphorus-containing compound of the present invention include, but are not limited to, ammonium phosphate, ammonium hydrogen phosphate, ammonium dihydrogen phosphate, sodium phosphate, sodium hydrogen phosphate, sodium dihydrogen phosphate, potassium phosphate, potassium hydrogen phosphate, potassium dihydrogen phosphate, aluminum phosphate, zinc phosphate, etc. Preferably, the phosphorus-containing compound of the present invention is ammonium phosphate, ammonium hydrogen phosphate, ammonium dihydrogen phosphate, aluminum phosphate, or zinc phosphate.

In the preparation method of the present invention, the rare-earth compound may be selected from one or more of a rare-earth metal carbonate, a rare-earth metal oxide, a rare-earth metal oxalate, a rare-earth metal sulfate, and a rare-earth metal nitrate; preferably the rare-earth metal carbonate or the rare-earth metal oxide, or the rare-earth metal oxalate; and more preferably the rare-earth metal carbonate or the rare-earth metal oxide. According to an embodiment of the present invention, the rare-earth compound is a cerium-containing compound selected from one or more of cerium carbonate, cerium oxide, cerium oxalate, cerium sulfate, and cerium nitrate; preferably cerium oxide, cerium carbonate, or cerium oxalate; and more preferably cerium oxide or cerium carbonate.

In the preparation method of the present invention, the sulfur source may be selected from one or more of sulfur, sulfide or sulfate; preferably sulfur and sulfide; and more preferably sulfur.

In the preparation method of the present invention, the alkali metal compound may be selected from one or more of a carbonate, an oxide, and a hydroxide of an alkali metal element. The alkali metal may be lithium, sodium or potassium. The alkali metal compound is preferably a carbonate; and specific examples thereof include sodium carbonate or potassium carbonate, and preferably sodium carbonate.

In the preparation method of the present invention, the molar ratio of the alkali metal element in the alkali metal compound to the rare-earth element in the rare-earth compound may be 0.06-0.30:1; preferably 0.08-0.25:1; and more preferably 0.1-0.2:1. Controlling the molar ratio of the alkali metal element to the rare-earth element within the above range is advantageous for enhancing the vividness.

In the preparation method of the present invention, the molar ratio of the alkali metal element in the alkali metal compound to the sulfur element in the sulfur source may be 0.02-0.1:1; preferably 0.035-0.1:1, and more preferably 0.04-0.08:1. Controlling the molar ratio of the alkali metal element to the sulfur element within the above range is advantageous for enhancing the vividness.

In the preparation method of the present invention, the molar ratio of the alkali metal element in the alkali metal compound to the phosphorus element in the phosphorus-containing compound may be 0.1-0.4:1; preferably 0.2-0.4:1, and more preferably 0.3-0.4:1. Controlling the molar ratio of the alkali metal element to the phosphorus element within the above range is advantageous for enhancing the vividness.

In the preparation method of the present invention, the molar ratio of the rare-earth element in the rare-earth compound to the sulfur element in the sulfur source may be 1:1.5-4; and preferably 1:2.0-3.9. Controlling the molar ratio of the rare-earth element to the sulfur element within the above range is advantageous for enhancing the vividness.

In the preparation method of the present invention, the molar ratio of the sulfur element in the sulfur source to the phosphorus element in the phosphorus-containing compound may be 0.9-16:1; preferably 3-13:1; and more preferably 5-10:1. Controlling the molar ratio of the sulfur element to the phosphorus element within the above range is advantageous for enhancing the vividness.

The mixture obtained by mixing the rare-earth compound, the sulfur source, the phosphorus-containing compound and the alkali metal compound is placed into a reaction vessel for a high-temperature solid phase reaction. The material of the reaction vessel may be a high-temperature resistant material, such as metal, ceramic, corundum or quartz. The present invention can carry out the high-temperature solid phase reaction using a container such as a graphite boat, a quartz tube or a crucible.

In the preparation method of the present invention, the mixture is reacted in the following atmosphere to obtain the colorant: hydrogen, hydrogen sulfide, carbon disulfide, carbon monoxide, nitrogen, or air. The atmosphere is preferably hydrogen sulfide, carbon disulfide, carbon monoxide and hydrogen. The reaction temperature of the present invention may be 700-1500° C., preferably 900-1300° C., and more preferably 1000-1200° C. This is advantageous for obtaining a colorant with better vividness.

The testing methods of the following examples and comparative examples are illustrated as follows:

The Lab value is tested using a CM-5 spectrocolorimeter of KONICA MINOLTA.

The XRD is tested using a D8 Advance x-ray diffractometer of Bruker Corporation, Germany.

Example 1

0.75 mol of sublimed sulfur, 0.15 mol of cerium carbonate, 0.0095 mol of anhydrous sodium carbonate and 0.063 mol of ammonium phosphate were mixed and reacted at 1000° C. for 3 hours. The reaction product was grinded, washed with water, and oven-dried to obtain a colorant of $Ce_{0.3}S_{0.45} \cdot 0.063$ [$CePO_4$]. The chromaticity coordinates were ($L^*=55$, $a^*=58$, and $b^*=40$).

Example 2

0.5 mol of sublimed sulfur, 0.15 mol of cerium oxide, 0.01125 mol of anhydrous sodium carbonate and 0.0675 mol of ammonium dihydrogen phosphate were mixed and reacted at 1000° C. for 3 hours. The reaction product was grinded, washed with water, and oven-dried to obtain a colorant of $Ce_{0.3}S_{0.45} \cdot 0.0675$ [$CePO_4$]. The chromaticity coordinates were ($L^*=55$, $a^*=58$, and $b^*=40$).

Example 3

0.75 mol of sublimed sulfur, 0.125 mol of cerium oxalate, 0.01625 mol of anhydrous sodium carbonate and 0.088 mol of diammonium hydrogen phosphate were mixed and reacted at 800° C. for 3 hours. The reaction product was grinded, washed with water, and oven-dried to obtain a colorant of $Ce_{0.25}S_{0.375} \cdot 0.088$ [$CePO_4$]. The chromaticity coordinates were ($L^*=55$, $a^*=58$, and $b^*=40$).

Example 4

0.5 mol of sublimed sulfur, 0.075 mol of cerium carbonate, 0.0135 mol of anhydrous sodium carbonate and 0.083 mol of zinc phosphate were mixed and reacted at 900° C. for 3 hours. The reaction product was grinded, washed with water, and oven-dried to obtain a colorant of $Ce_{0.15}S_{0.225} \cdot 0.083$ [$CePO_4$]. The chromaticity coordinates were ($L^*=55$, $a^*=58$, and $b^*=40$).

Example 5

0.75 mol of sublimed sulfur, 0.125 mol of cerium carbonate, 0.02 mol of anhydrous sodium carbonate and 0.1 mol of aluminum phosphate were mixed and reacted at 1000° C. for 3 hours. The reaction product was grinded, washed with water, and oven-dried to obtain a colorant of $Ce_{0.25}S_{0.375} \cdot 0.1$ [$CePO_4$]. The chromaticity coordinates were ($L^*=55$, $a^*=58$, and $b^*=40$).

Example 6

0.5 mol of sublimed sulfur, 0.085 mol of cerium carbonate, 0.01 mol of anhydrous sodium carbonate and 0.054 mol of aluminum phosphate were mixed and reacted at 1000° C. for 3 hours. The reaction product was grinded, washed with water, and oven-dried to obtain a colorant of $Ce_{0.17}S_{0.255} \cdot 0.054$ [$CePO_4$]. The chromaticity coordinates were ($L^*=55$, $a^*=58$, and $b^*=40$).

Example 7

0.75 mol of sublimed sulfur, 0.13 mol of cerium carbonate, 0.015 mol of anhydrous sodium carbonate and 0.075 mol of aluminum phosphate were mixed and reacted at 1000° C. for 3 hours. The reaction product was grinded, washed with water, and oven-dried to obtain a colorant of $Ce_{0.26}S_{0.39} \cdot 0.075$ [$CePO_4$]. The chromaticity coordinates were ($L^*=55$, $a^*=58$, and $b^*=40$).

Example 8

0.75 mol of sublimed sulfur, 0.15 mol of lanthanum carbonate, 0.0095 mol of anhydrous sodium carbonate and 0.063 mol of ammonium phosphate were mixed and reacted at 1000° C. for 3 hours. The reaction product was grinded, washed with water, and oven-dried to obtain a colorant of $La_{0.3}S_{0.45} \cdot 0.063$ [$LaPO_4$]. The chromaticity coordinates were ($L^*=80$, $a^*=-20$, and $b^*=40$).

Example 9

0.5 mol of sublimed sulfur, 0.15 mol of lanthanum oxide, 0.01125 mol of anhydrous sodium carbonate and 0.0675 mol of ammonium dihydrogen phosphate were mixed and reacted at 1000° C. for 3 hours. The reaction product was grinded, washed with water, and oven-dried to obtain a colorant of $La_{0.3}S_{0.45}.0.0675\ [LaPO_4]$. The chromaticity coordinates were ($L^*$=80, $a^*$=−20, and $b^*$=40).

Example 10

0.75 mol of sublimed sulfur, 0.125 mol of lanthanum oxalate, 0.01625 mol of anhydrous sodium carbonate and 0.088 mol of diammonium hydrogen phosphate were mixed and reacted at 800° C. for 3 hours. The reaction product was grinded, washed with water, and oven-dried to obtain a colorant of $La_{0.25}S_{0.375}.0.088\ [LaPO_4]$. The chromaticity coordinates were ($L^*$=80, $a^*$=−20, and $b^*$=40).

Example 11

0.5 mol of sublimed sulfur, 0.075 mol of lanthanum carbonate, 0.0135 mol of anhydrous sodium carbonate and 0.083 mol of zinc phosphate were mixed and reacted at 900° C. for 3 hours. The reaction product was grinded, washed with water, and oven-dried to obtain a colorant of $La_{0.15}S_{0.225}.0.083\ [LaPO_4]$. The chromaticity coordinates were ($L^*$=80, $a^*$=−20, and $b^*$=40).

Example 12

0.75 mol of sublimed sulfur, 0.125 mol of lanthanum carbonate, 0.02 mol of anhydrous sodium carbonate and 0.1 mol of aluminum phosphate were mixed and reacted at 1000° C. for 3 hours. The reaction product was grinded, washed with water, and oven-dried to obtain a colorant of $La_{0.25}S_{0.375}.0.1\ [LaPO_4]$. The chromaticity coordinates were ($L^*$=80, $a^*$=−20, and $b^*$=40).

Example 13

0.5 mol of sublimed sulfur, 0.085 mol of lanthanum carbonate, 0.01 mol of anhydrous sodium carbonate and 0.054 mol of aluminum phosphate were mixed and reacted at 1000° C. for 3 hours. The reaction product was grinded, washed with water, and oven-dried to obtain a colorant of $La_{0.17}S_{0.255}.0.054\ [LaPO_4]$. The chromaticity coordinates were ($L^*$=80, $a^*$=−20, and $b^*$=40).

Example 14

0.75 mol of sublimed sulfur, 0.13 mol of lanthanum carbonate, 0.015 mol of anhydrous sodium carbonate and 0.075 mol of aluminum phosphate were mixed and reacted at 1000° C. for 3 hours. The reaction product was grinded, washed with water, and oven-dried to obtain a colorant of $La_{0.26}S_{0.39}.0.075\ [LaPO_4]$. The chromaticity coordinates were ($L^*$=80, $a^*$=−20, and $b^*$=40).

Example 15

0.75 mol of sublimed sulfur, 0.15 mol of samaric carbonate, 0.0095 mol of anhydrous sodium carbonate and 0.063 mol of ammonium phosphate were mixed and reacted at 1000° C. for 3 hours. The reaction product was grinded, washed with water, and oven-dried to obtain a colorant of $Sm_{0.3}S_{0.45}.0.063\ [SmPO_4]$. The chromaticity coordinates were ($L^*$=85, $a^*$=5, and $b^*$=85).

Example 16

0.5 mol of sublimed sulfur, 0.15 mol of samarium oxide, 0.01125 mol of anhydrous sodium carbonate and 0.0675 mol of ammonium dihydrogen phosphate were mixed and reacted at 1000° C. for 3 hours. The reaction product was grinded, washed with water, and oven-dried to obtain a colorant of $Sm_{0.3}S_{0.45}.0.0675\ [SmPO_4]$. The chromaticity coordinates were ($L^*$=85, $a^*$=5, and $b^*$=85).

Example 17

0.75 mol of sublimed sulfur, 0.125 mol of samarium oxalate, 0.01625 mol of anhydrous sodium carbonate and 0.088 moles of diammonium hydrogen phosphate were mixed and reacted at 800° C. for 3 hours. The reaction product was grinded, washed with water, and oven-dried to obtain a colorant of $Sm_{0.25}S_{0.375}.0.088\ [SmPO_4]$. The chromaticity coordinates were ($L^*$=85, $a^*$=5, and $b^*$=85).

Example 18

0.5 mol of sublimed sulfur, 0.075 mol of samaric carbonate, 0.0135 mol of anhydrous sodium carbonate and 0.083 mol of zinc phosphate were mixed and reacted at 900° C. for 3 hours. The reaction product was grinded, washed with water, and oven-dried to obtain a colorant of $Sm_{0.15}S_{0.225}.0.083\ [SmPO_4]$. The chromaticity coordinates were ($L^*$=85, $a^*$=5, and $b^*$=85).

Example 19

0.75 mol of sublimed sulfur, 0.125 mol of samaric carbonate, 0.02 mol of anhydrous sodium carbonate and 0.1 mol of aluminum phosphate were mixed and reacted at 1000° C. for 3 hours. The reaction product was grinded, washed with water, and oven-dried to obtain a colorant of $Sm_{0.25}S_{0.375}.0.1\ [SmPO_4]$. The chromaticity coordinates were ($L^*$=85, $a^*$=5, and $b^*$=85).

Example 20

0.75 mol of sublimed sulfur, 0.13 mol of samaric carbonate, 0.015 mol of anhydrous sodium carbonate, and 0.075 mol of aluminum phosphate were mixed and reacted at 1000° C. for 3 hours. The reaction product was grinded, washed with water, and oven-dried to obtain a colorant of $Sm_{0.26}S_{0.39}.0.075\ [SmPO_4]$. The chromaticity coordinates were ($L^*$=85, $a^*$=5, and $b^*$=85).

Example 21

0.5 mol of sublimed sulfur, 0.085 mol of samaric carbonate, 0.01 mol of anhydrous sodium carbonate, and 0.054 mol of aluminum phosphate were mixed and reacted at 1000° C. for 3 hours. The reaction product was grinded, washed with water, and oven-dried to obtain a colorant of $Sm_{0.17}S_{0.255}.0.054\ [SmPO_4]$. The chromaticity coordinates were ($L^*$=85, $a^*$=5, and $b^*$=85).

Example 22

0.75 mol of sublimed sulfur, 0.13 mol of cerium carbonate, 0.015 mol of anhydrous sodium carbonate, and 0.0375 mol of phosphorus pentoxide were mixed and reacted at 1000° C. for 3 hours. The reaction product was grinded, washed with water, and oven-dried to obtain a colorant of $Ce_{0.26}S_{0.39}.0.075\ [CePO_4]$. The chromaticity coordinates were ($L^*$=55, $a^*$=58, and $b^*$=40).

Comparative Example 1

0.75 mol of sublimed sulfur, 0.15 mol of cerium carbonate and 0.0095 mol of anhydrous sodium carbonate were mixed and reacted at 1000° C. for 3 hours. The reaction product was grinded, washed with water, and oven-dried to obtain a colorant of $Ce_2S_3$. The chromaticity coordinates were (L*=49, a*=50, and b*=44).

The present invention is not limited to the above-described embodiments, and any variation, modification, and alteration that may be occur to those skilled in the art without departing from the substantive content of the present invention fall within the scope of the present invention.

What is claimed is:

1. A rare-earth sulfide colorant of the chemical formula below:

$$RE_{2-2x}S_{3-3x} \cdot 2y \, [REPO_4]$$

wherein RE is selected from one or more of La, Ce, Pr, Nd, and Sm, and the ratio of y to x is 0.001 to 0.65, and the chromaticity coordinates of the colorant are:

(1) L=55±5, a=58±5 and b=40±5;
(2) L=80±5, a=−20±5 and b=40±5 or
(3) L=85±5, a=5±2 and b=85±5.

2. The colorant according to claim 1, wherein RE is La, Ce, Pr or Nd, and the ratio of y to x is from 0.01 to 0.55.

3. A method for preparing the colorant according to claim 1, comprising the steps of: mixing a rare-earth compound, a sulfur source, a phosphorus-containing compound and an alkali metal compound to obtain a mixture, and reacting the mixture at 700-1500° C. to obtain the colorant; wherein the phosphorus-containing compound is selected from one or more of an alkali metal phosphate, an alkali metal hydrophosphate, an alkali metal dihydric phosphate, an alkaline-earth metal phosphate, a rare-earth metal phosphate, a transition metal phosphate, an ammonium phosphate, an ammonium hydrogen phosphate, an ammonium dihydrogen phosphate, an aluminum phosphate, a boron phosphate, and phosphorus pentoxide; and the preparation method does not comprise a fluorine-washing treatment process.

4. The preparation method according to claim 3, wherein the rare-earth compound is selected from one or more of a rare-earth metal carbonate, a rare-earth metal oxide, a rare-earth metal oxalate, a rare-earth metal sulfate, and a rare-earth metal nitrate; the sulfur source is selected from one or more of sulfur, sulfide or sulfate; and the alkali metal compound is selected from one or more of a carbonate, an oxide and a hydroxide of an alkali metal element.

5. The preparation method according to claim 3, wherein a molar ratio of the alkali metal element in the alkali metal compound to the rare-earth element in the rare-earth compound is 0.06-0.30:1; the molar ratio of the alkali metal element in the alkali metal compound to the sulfur element in the sulfur source is 0.02-0.1:1; and the molar ratio of the alkali metal element in the alkali metal compound to the phosphorus element in the phosphorus-containing compound is 0.1-0.4:1.

6. The preparation method according to claim 3, wherein a molar ratio of the rare-earth element in the rare-earth compound to the sulfur element in the sulfur source is 1:1.5-4, and a molar ratio of the sulfur element in the sulfur source to the phosphorus element in the phosphorus-containing compound is 0.9-16:1.

7. The preparation method according to claim 3, wherein the mixture is reacted in the following atmosphere to obtain the colorant: hydrogen, hydrogen sulfide, carbon disulfide, carbon monoxide, nitrogen, or air.

* * * * *